(12) United States Patent
Tasaka et al.

(10) Patent No.: US 11,377,047 B2
(45) Date of Patent: Jul. 5, 2022

(54) COVER MEMBER AND WIRE HARNESS

(71) Applicants: Yazaki Corporation, Tokyo (JP);
TOYOTA JIDOSHA KABUSHIKI KAISHA, Aichi-ken (JP)

(72) Inventors: Yoshiro Tasaka, Shizuoka (JP);
Takeshi Sakamoto, Shizuoka (JP);
Mitsuhiro Kato, Aichi (JP)

(73) Assignees: YAZAKI CORPORATION, Tokyo (JP); TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 17/083,310

(22) Filed: Oct. 29, 2020

(65) Prior Publication Data
US 2021/0122305 A1 Apr. 29, 2021

(30) Foreign Application Priority Data
Oct. 29, 2019 (JP) .............................. JP2019-195860

(51) Int. Cl.
| B60R 16/02 | (2006.01) |
| H01B 17/58 | (2006.01) |
| H02G 3/04 | (2006.01) |
| H02G 3/22 | (2006.01) |

(52) U.S. Cl.
CPC ...... B60R 16/0207 (2013.01); B60R 16/0215 (2013.01); H01B 17/58 (2013.01); H02G 3/0462 (2013.01); H02G 3/22 (2013.01)

(58) Field of Classification Search
CPC .............. B60R 16/0207; B60R 16/022; B60R 16/0215; H02G 15/013; H02G 15/04; H02G 15/10; H02G 15/18
See application file for complete search history.

(56) References Cited

U.S. PATENT DOCUMENTS

| 3,016,562 A * | 1/1962 | Reid ..................... H02G 3/083 16/2.1 |
| 6,583,352 B2 * | 6/2003 | Fukushima ............ H02G 3/088 439/271 |
| 2014/0054064 A1 * | 2/2014 | Gronowicz, Jr. ... B60R 16/0222 174/152 G |
| 2017/0012384 A1 * | 1/2017 | Sugino ............... H01R 13/5205 |
| 2018/0019041 A1 * | 1/2018 | Takahashi ............ H01B 7/2825 |
| 2019/0157803 A1 * | 5/2019 | Fujiki .................... H01R 13/64 |

FOREIGN PATENT DOCUMENTS

| JP | H5-91114 U | 12/1993 |
| JP | 2005-129240 A | 5/2005 |
| JP | 2016-185008 A | 10/2016 |
| WO | 2016/153045 A1 | 9/2016 |

* cited by examiner

*Primary Examiner* — Paresh Paghadal
(74) *Attorney, Agent, or Firm* — Kenealy Vaidya LLP (57) ABSTRACT

A cover member includes: a main body; and a binding member. The main body includes, when viewed from the axial direction, a base area, a first overlap area located on one side, and a second overlap area located on the other side with the base area interposed therebetween. The first overlap area includes a first end part out of the main-body both end parts. The second overlap area includes a second end part out of the main-body both end parts. The base area is formed to be able to change an overlap amount of the first overlap area and the second overlap area. The main-body both end parts are formed from one opening part to the other opening part out of a pair of opening parts that communicate an inside space with the outside.

8 Claims, 7 Drawing Sheets

COVER MEMBER AND WIRE HARNESS

CROSS-REFERENCE TO RELATED APPLICATION(S)

The present application claims priority to and incorporates by reference the entire contents of Japanese Patent Application No. 2019-195860 filed in Japan on Oct. 29, 2019.

BACKGROUND OF THE INVENTION

1. Field of the Invention

The present invention relates to a cover member and a wire harness.

2. Description of the Related Art

As for conventional wire harnesses, there is a type that includes a cable routing material extended in an axial direction and a cover member such as a grommet for covering the cable routing material (see Japanese Patent Application Laid-open No. 2016-185008, for example). One of opening parts of the cover member is formed to correspond to the shape of a tubular part of a shield shell that is attached with a cable tie as a binding member. In other words, cover members with opening parts corresponding to the shapes of the tubular parts of the respective shield shells are provided through providing a cover member having opening parts of a given size for a tubular part of a given shield shell and providing a cover member having opening parts of another size for a tubular part of another shield shell.

By the way, as for the cover member described above, it is necessary to change the design of one of the opening parts according to the shape of the tubular part of the shield shell that is a cable routing material. Therefore, the kinds of the cover members are increased, which results in increasing the cost and the like.

SUMMARY OF THE INVENTION

The present invention is designed in view of the foregoing circumstance, and it is an object thereof to provide a cover member that exhibits versatility and requires no individual design change for corresponding to the shapes of the cable routing materials.

In order to solve the above mentioned problem and achieve the object, a cover member according to one aspect of the present invention includes a main body that includes main-body both end parts at both ends in a circumferential direction when viewed from an axial direction, the main body being configured to cover a part of a cable routing material; and a binding member that is configured to fix the cable routing material to the main body when a part of the cable routing material is disposed in an inside space of the main body, wherein the main body includes, when viewed from the axial direction, a base area, a first overlap area located on one side, and a second overlap area located on the other side with the base area interposed therebetween, the first overlap area includes a first end part out of the main-body both end parts, the second overlap area includes a second end part out of the main-body both end parts, the base area is formed to be able to change an overlap amount of the first overlap area and the second overlap area, and the main-body both end parts are formed from one opening part out of a pair of opening parts to the other opening part, the pair of opening parts communicating the inside space with an outside.

According to another aspect of the present invention, in the cover member, it is preferable that the main body includes, at a position corresponding to the one opening part, a flange part formed to be projected toward an outside of a radial direction, the flange part includes, when viewed from the axial direction, flange both end parts at both ends of the circumferential direction, and one end part out of the flange both end parts is located on a boundary between the base area and the first overlap area, and the other end part out of the flange both end parts is located at the second end part out of the main-body both end parts.

According to still another aspect of the present invention, in the cover member, it is preferable that in the main body when viewed from the axial direction, thickness of the first overlap area is thinner than thickness of the base area because an outside of the first overlap area in a radial direction is cut out, and thickness of the second overlap area is thinner than thickness of the base area because an inner side of the second overlap area in the radial direction is cut out.

According to still another aspect of the present invention, in the cover member, it is preferable that the main body includes: a pair of curved parts that oppose to each other in a first orthogonal direction that is orthogonal to the axial direction; a first linear part that connects end parts on respective sides of the pair of curved parts in a second orthogonal direction that is orthogonal to the axial direction and the first orthogonal direction; a second linear part that extends along the first orthogonal direction from the other side in the second orthogonal direction of a first curved part out of the pair of curved parts and opposes to the first linear part; and a third linear part that extends along the first orthogonal direction from the other side in the second orthogonal direction of a second curved part out of the pair of curved parts and opposes to the first linear part, the base area is the first linear part, the first curved part, and the second curved part, the first overlap area is the second linear part, and the second overlap area is the third linear part.

According to still another aspect of the present invention, in the cover member, it is preferable that the main body includes a bulge part that is located to be isolated from the flange part in the axial direction and is bulged toward the outside of the radial direction, and the binding member is disposed in a recessed part located between the flange part and the bulge part.

According to still another aspect of the present invention, in the cover member, it is preferable that the cable routing material includes: an electric wire that exhibits conductivity and is extended along the axial direction; a braided conductor that is formed with a conductive material and covers an outer peripheral surface of the electric wire; and a shield shell that is electrically connected to the braided conductor and covers an outer peripheral surface of one end part of the electric wire in the axial direction, and the main body is to be fixed to the shield shell with the binding member.

In order to solve the above mentioned problem and achieve the object, a wire harness according to still another aspect of the present invention includes a cable routing material extended along an axial direction; and a cover member, wherein the cover member includes: a main body that includes main-body both end parts at both ends in a circumferential direction when viewed from the axial direction, the main body covering a part of the cable routing material; and a binding member that fixes the cable routing material to the main body when a part of the cable routing material is disposed in an inside space of the main body, the main body includes, when viewed from the axial direction, a base area, a first overlap area located on one side, and a second overlap area located on the other side with the base area interposed therebetween, the first overlap area includes a first end part out or the main-body both end parts, the second overlap area includes a second end part out of the main-body both end parts, the base area is formed to be able to change an overlap amount of the first overlap area and the second overlap area, and the main-body both end parts are formed from one opening part out of a pair of opening parts to the other opening part, the pair of opening parts communicating the inside space with an outside.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENT

Hereinafter, an embodiment of the present invention will be described in detail by referring to the accompanying drawings. Note that the present invention is not limited by the embodiment. Further, structural elements in the following embodiment include elements that may easily occur to those skilled in the art or elements that are substantially the same.

Embodiment

A wire harness WH1 and a cover member 3 according to an embodiment will be described in detail. Further, among the first, second, and third directions orthogonal to each other in the following description, the first direction is referred to as "axial direction X", the second direction is referred to as "first orthogonal direction Y", and the third direction is referred to as "second orthogonal direction Z". The axial direction X is the direction along which first electric wires Wa1 configuring a cable routing material W is extended in an inside space 3s of a main body 3A of the cover member 3. The first orthogonal direction Y is the direction along which a pair of curved parts 33a and 33b configuring the main body 3A oppose to each other. The second orthogonal direction Z is the direction along which a first linear part 34 and a second linear part 35 configuring the main body 3A oppose to each other, and along which the first linear part 34 and a third linear part 36 oppose to each other.

Figure 1:
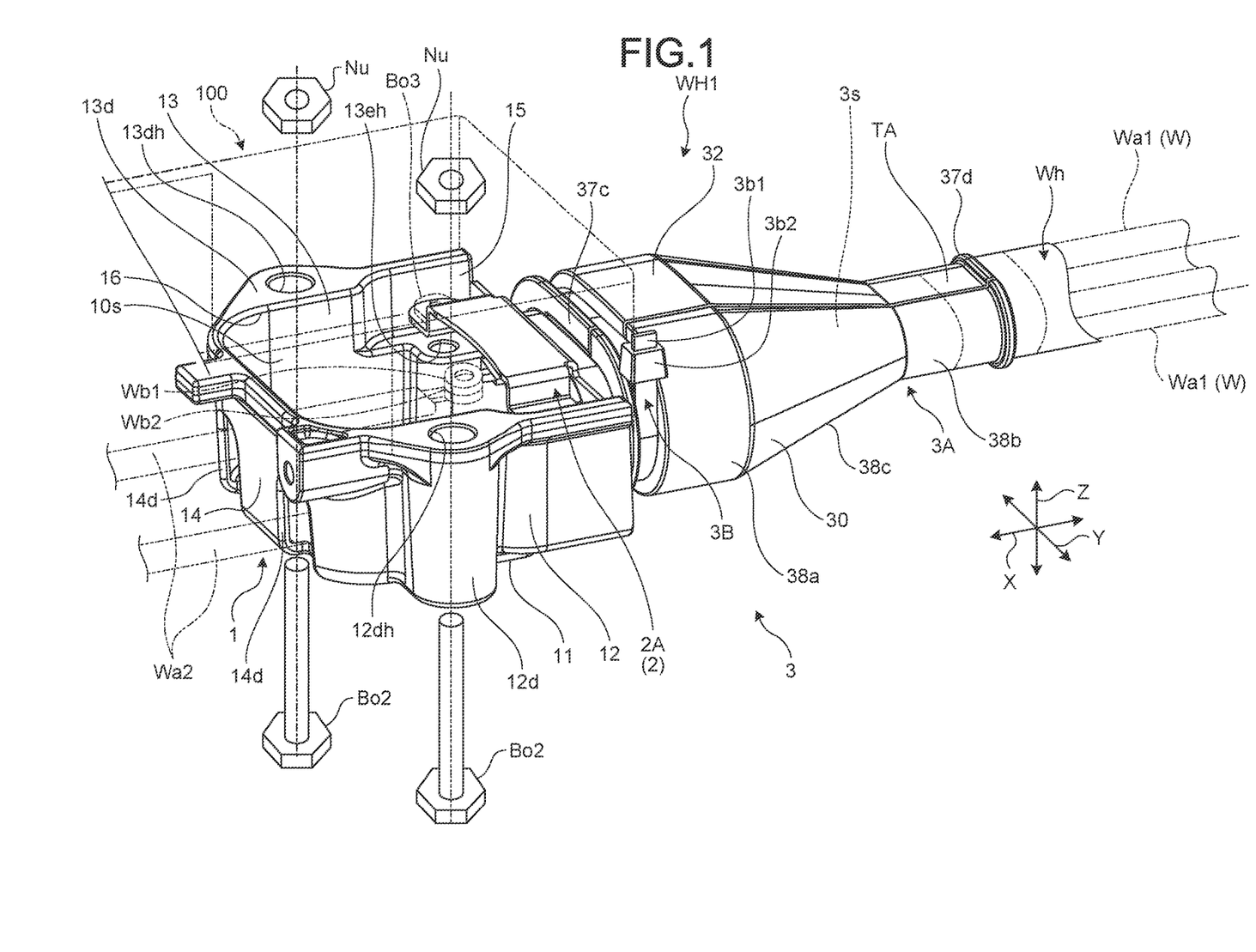
FIG. 1 is a perspective view illustrating a wire harness that includes a cover member according to an embodiment.

The cover member 3 according to the embodiment illustrated in FIG. 1 is assembled in the wire harness WH1 loaded on a vehicle such as an automobile to cover a part of the cable routing material W extended along the axial direction X so as to protect a part of the cable routing material W. The wire harness WH1 is used for connecting each of devices loaded on a vehicle, for example, by bundling a plurality of cable routing materials W used for power supply and signal communication as an assembly component and connecting the cable routing materials W to each of the devices via a connector 1 or the like. The wire harness WH1 includes the cable routing materials W and the cover member 3, for example. The cable routing material W includes the first electric wire Wa1, a braided conductor Wh, the connector 1, and a shield shell 2, for example. The first electric wire Wa1 is conductive and extended along the axial direction X. Such a first electric wire Wa1 is formed by, for example, covering, with a cover part exhibiting an insulation characteristic, an outside of a conductor part (core wire) configured with a plurality of conductive metal wires. As for the first electric wire Wa1, a metal terminal Wb1 is provided at its terminal. The metal terminal Wb1 is formed in a circular shape having a through hole with a conductive metal material. The braided conductor Wh is formed with a conductive material by covering an outer peripheral surface of two first electric wires Wa1, and suppresses leakage of noise generated from the first electric wires Wa1 to the outside. The braided conductor Wh is formed in a tubular shape by braiding a plurality of braided wires in a mesh form. As for the braided conductor Wh in FIG. 1, FIG. 2, and FIG. 4, the mesh of the braided conductor Wh is omitted for simplifying the drawings. One end part of the braided conductor Wh in the axial direction X is electrically connected to the shield shell 2, and earthed via the shield shell 2 and an earth member of a mating connector 100. The connector 1 houses the metal terminal Wb1 provided at the terminal of the first electric wire Wa1 and a mating metal terminal Wb2 provided at a terminal of a mating electric wire Wa2 (see FIG. 2). The shield shell 2 is electrically connected to the braided conductor Wh, and covers the outer peripheral surface of one end part of the first electric wire Wa1 in the axial direction X. Note that the wire harness WH1 may be configured by including, in addition to those described above, an electrical junction box, a grommet, and the like. Hereinafter, the configuration of the connector 1 will be described in detail by referring to each of the drawings.

Figure 2:
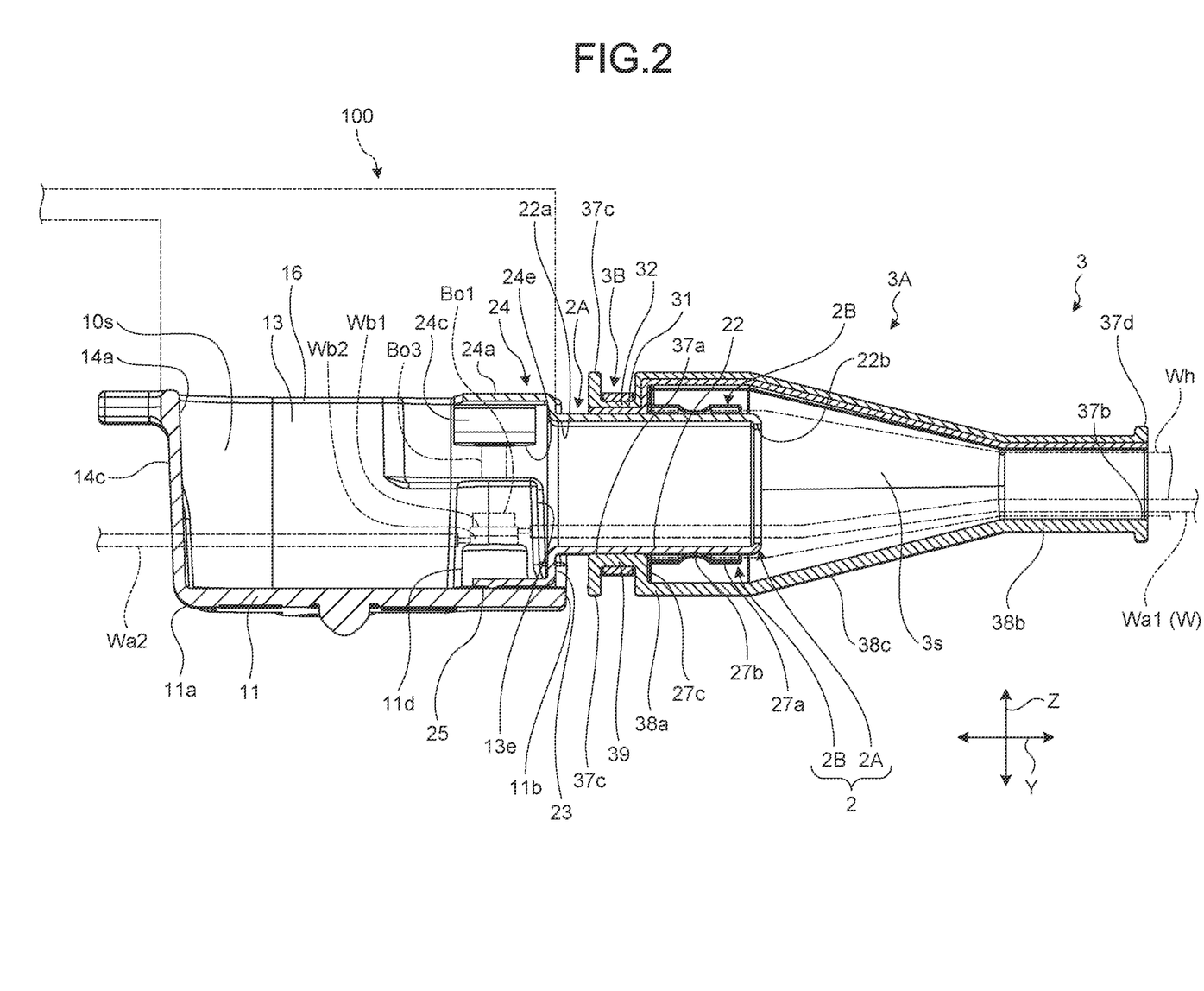
FIG. 2 is a sectional view of the wire harness.
Figure 4:
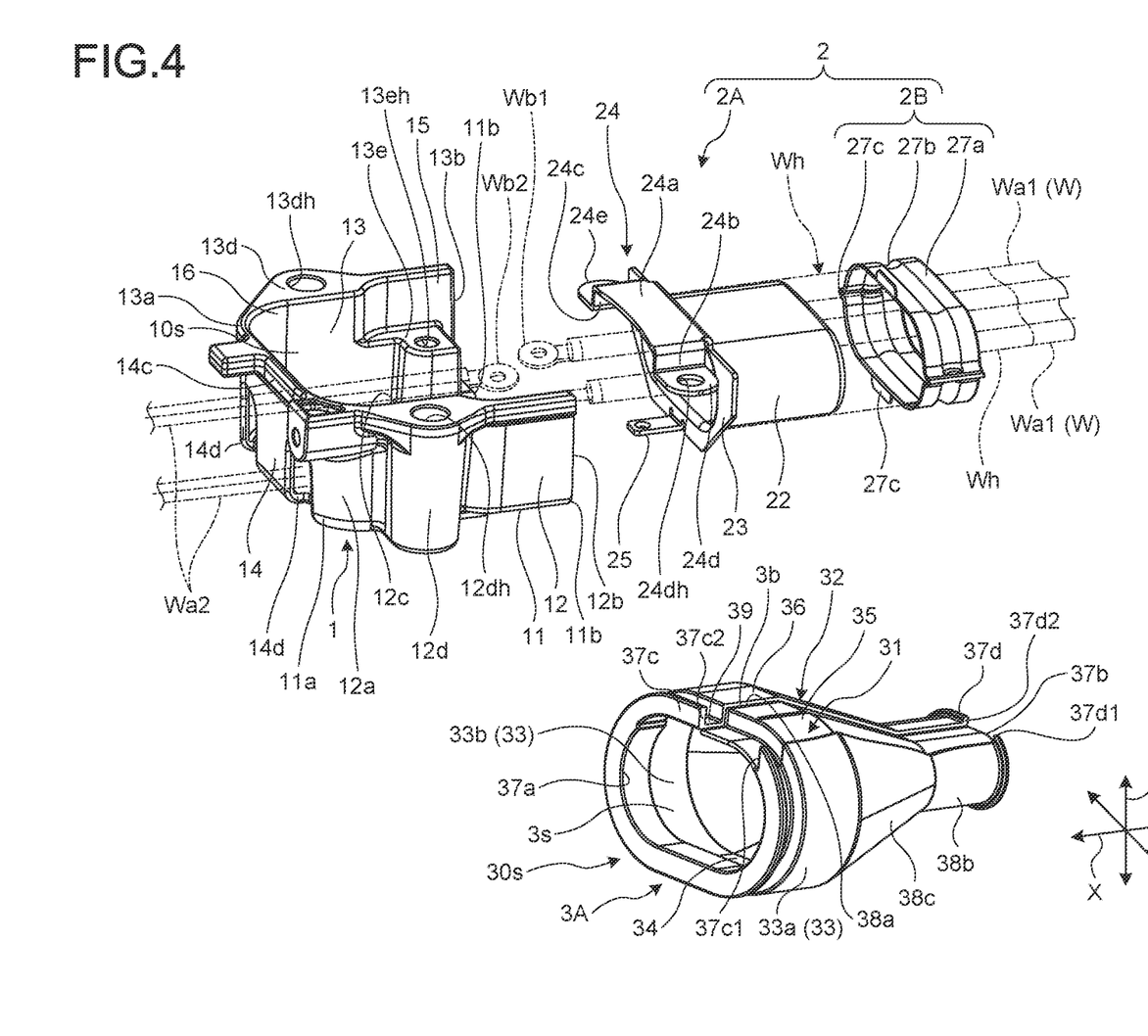
FIG. 4 is an exploded perspective view of the wire harness.

The connector 1 illustrated in FIG. 1, FIG. 2, and FIG. 4 is attached to the mating connector 100, and formed integrally with an insulating synthetic resin. The connector 1 of the embodiment houses the metal terminal Wb1 provided at the terminal of the first electric wire Wa1 inside a housing space 10s. The connector 1 includes a base wall part 11, a pair of sidewall parts 12 and 13, and a connecting wall part 14. Further, the connector 1 is formed with the housing space 10s that is formed with the base wall part 11, the pair of sidewall parts 12 and 13, and the connecting wall part 14, a shell insertion opening part 15, and a mating connector opening part 16.

The base wall part 11 is a wall body for sectioning the housing space 10s. The base wall part 11 is formed in a flat rectangular shape, for example.

The pair of sidewall parts 12 and 13 are wall bodies for sectioning the housing space 10s, and oppose to each other in the first orthogonal direction Y. The pair of sidewall parts 12 and 13 according to the embodiment are provided on both sides of the base wall part 11 by sandwiching the base wall part 11 along the first orthogonal direction Y, and formed to be projected toward the second orthogonal direction Z from the base wall part 11.

The connecting wall part 14 is a wall body for sectioning the housing space 10s, which connects end parts 12a and 13a on one side of the pair of sidewall parts 12 and 13 in the axial direction X, and extends along the orthogonal direction Y. The connecting wall part 14 according to the embodiment is connected to an end part 11a on one side of the base wall part 11 in the axial direction X.

The housing space 10s is a space that houses the metal terminal Wb1 provided at the terminal of the first electric wire Wa1 and the mating metal terminal Wb2 provided at the terminal of the mating electric wire Wa1 of the mating connector 100 inside the connector 1. The housing space 10s is surrounded by and formed by the base wall part 11, the pair of sidewall parts 12 and 13, and the connecting wall part 14.

The shell insertion opening part 15 is an opening part for allowing the first electric wire Wa1 and the shield shell 2 to be inserted into the housing space 10s. The shell insertion opening part 15 is formed with the other end part 11b of the base wall part 11 in the axial direction X, and the other end parts 12b and 13b of the pair of respective sidewall parts 12 and 13 in the axial direction X (see FIG. 4). Such a shell insertion opening part 15 is opened along the first orthogonal direction Y and the second orthogonal direction Z.

The mating connector opening part 16 is an opening part for communicating the housing space 10s and a mating housing space of the mating connector 100. The mating connector opening part 16 is formed with end parts 12c and 13c of the pair of sidewall parts 12 and 13 on the opposite side of the base wall part 11 along the second orthogonal direction Z and with an end part 14c of the connecting part on the opposite side of the base wall part 11 along the second orthogonal direction Z. The mating connector opening part 16 is opened along the axial direction X and the first orthogonal direction Y.

The base wall part 11 has a tubular part 11d that is projected along the second orthogonal direction Z inside (the housing space 10s) the connector 1. For example, two tubular parts 11d are formed in the base wall part 11. The tubular part 11d has a screw hole in an inner peripheral surface. The screw hole is capable of fastening a screw part of a first bolt Bo1 (see FIG. 2). While the screw part of the first bolt Bo1 is being inserted into the through hole of the metal terminal Wb1 and the through hole of the mating metal terminal Wb2, the screw part of the first bolt Bo1 and the screw hole are fastened so as to tighten the metal terminal Wb1 and the mating metal terminal Wb2 together to be fixed to the connector 1. In this state, the connector 1 houses the metal terminal Wb1 and the mating metal terminal Wb2 in the housing space 10s. Further, the first electric wire Wa1 and the mating electric wire Wa2 are electrically connected.

The pair of sidewall parts 12 and 13 include respective outside block bodies 12d and 13d located outside the connector 1. The outside block bodies 12d and 13d are provided on the outer peripheral surfaces of the pair of sidewall parts 12 and 13, and include through holes 12dh and 13dh extended along the second orthogonal direction Z. Further, the connector 1 is attached to the mating connector 100 by fastening a screw part of a second bolt Bo2 and a screw hole of a nut while the screw part of the second bolt Bo2 is being inserted into the through holes 12dh and 13dh of the outside block bodies 12d and 13d and into a through hole of the mating connector 100.

Each of the pair of sidewall parts 12 and 13 includes an inner block body located inside (the housing space 10s) the connector 1. The configurations of the inner block bodies of the pair of sidewall parts 12 and 13 are the same with each other so that, for simplifying the description, only an inner block body 13e of the sidewall part 13 will be described while omitting description of the inner block body of the sidewall part 12. The inner block body 13e is provided in the inner peripheral surface of the pair of sidewall parts 12 and 13, and has a screw hole 13eh extended along the second orthogonal direction Z. Further, the shield shell 2 is attached to the connector 1 by fastening a screw part of a third bolt Bo3 and the screw hole 13eh of the inner block body 13e in a state where the screw part of the third bolt Bo3 is being inserted into through holes 24dh and 24eh of through-hole forming parts 24d and 24e of the shield shell 2 to be described later.

An insertion opening part 14d is formed in the connecting wall part 14 for inserting the mating electric wire Wa2 into the housing space 10s. Two insertion opening parts 14d are formed in the connecting wall part 14 of the embodiment, and the mating electric wire Wa2 is inserted into each of the insertion opening parts 14d. Next, the shield shell 2 to be inserted into the shell insertion opening part 15 of the connector 1 will be described.

The shield shell 2 includes a shell main body 2A and a ring member 2B (see FIG. 2). The shell main body 2A is formed with a conductive material such as a metal, and suppresses leakage of noise generated from the first electric wires Wa1 to the outside. The shell main body 2A includes a shell tubular part 22, a shell flange part 23, a shell fixed part 24, and a shell connecting part 25.

The shell tubular part 22 is formed in an oval tubular shape extended along the axial direction X, and includes a pair of shell opening parts 22a and 22b at both ends of the axial direction X. The pair of shell opening parts is the first opening part 22a located at one end side (tip side) of the axial direction X and the second shell opening part 22b located at the other end side (base end side) of the axial direction X (see FIG. 4). The first electric wire Wa1 is inserted to the first shell opening part 22a and the second shell opening part 22b.

The shell flange part 23 is formed to be projected toward the outside of a radial direction at a position corresponding to the first shell opening part 22a that is located at one end side of the shell tubular part 22 in the axial direction X. The shell flange part 23 comes in contact with the inner block body 13e of the sidewall parts 12 and 13 of the connector 1, so that the position of the shield shell 2 in the axial direction X with respect to the connector 1 is determined (see FIG. 2).

The shell fixing part 24 is for fixing the shield shell 2 to the connector 1, and includes a plate part 24a, a pair of opposing wall parts 24b and 24c, and a pair of through-hole forming parts 24d and 24e. The plate part 24a is formed in a mode to be projected from the tip side of the shell flange part 23 in the second orthogonal direction Z toward the one end side (tip side) of the axial direction X. The pair of opposing wall parts 24b and 24c are formed in a mode to be projected from both ends of the plate part 24a in the first orthogonal direction Y toward the other side in the second orthogonal direction Z. The through-hole forming parts 24*d* and 24*e* are formed in a mode to be isolated from each other in the first orthogonal direction Y from the tips of the pair of opposing wall parts 24*b* and 24*c* in the first orthogonal direction. The through-hole forming parts 24*d* and 24*e* include through holes 24*dh* and 24*eh*. The through holes 24*dh* and 24*eh* are formed in a mode to go through the through-hole forming parts 21*d* and 24*e* in the second orthogonal direction Z. As described above, in a state where the screw part of the third bolt Bo3 is inserted into the through holes 24*dh* and 24*eh*, the screw part of the third bolt Bo3 and the screw hole 13*eh* of the inner block body 13*e* are fastened so as to attach the shield shell 2 to the connector 1.

The shell connecting part 25 is electrically connected to the earthed grounding member of the mating connector 100, and disposed to oppose to the plate part 24*a* in the second orthogonal direction Z.

The ring member 2B is formed in a substantially oval tubular shape along the axial direction X with a conductive material such as a metal. The ring member 2B includes a ring main body 27*a*, a ring projection part 27*b*, and a pair of ring abutting parts 27*c*, and it is attached to the outer peripheral surface of the shell tubular part 22 as will be described later.

The ring main body 27*a* includes a pair of ring opening parts 27*a*1 and 27*a*2 at both ends of the axial direction X. The pair of ring opening parts 27*a*1 and 27*a*2 are for inserting the shell tubular part 22. The pair of ring opening parts 27*a*1 and 27*a*2 are the first ring opening part 27*a*1 located at one end side (tip side) in the axial direction X, and the second ring opening part 27*a*2 located at one end side (tip side) in the axial direction X.

The ring projection part 27*b* is located in the center of the ring main body 27*a* in the axial direction X, and formed in a mode to be projected toward the inner side of the radial direction with respect to the inner peripheral surface of the ring main body 27*a*.

The pair of ring abutting parts 27*c* are disposed at one end side (tip side) of the ring main body 27*a* in the axial direction X, and formed to be projected toward the outside of the radial direction at a position corresponding to the first ring opening part 27*a*1. Such a pair of ring abutting parts 27*c* some in contact with the wall part that forms a bulge part 38*a* and a recessed part 39 of the cover member 3 at the time of assembling to be described later, so that the position of the ring member 2B in the axial direction X with respect to the cover member 3 is determined. The outer peripheral surface of the shell tubular part 22 and the outer peripheral surface of the ring member 2B are covered by the cover member 3 to be described hereinafter.

The cover member 3 includes the main body 3A and a binding member 3B. The main body 3A is formed to be elastically deformable with a synthetic resin material exhibiting an insulation characteristic, for example, and extended along the axial direction X as illustrated in FIG. 1. The cover member 3 includes a grommet and a boot, and covers the ring member 2B and the like.

Figure 5:
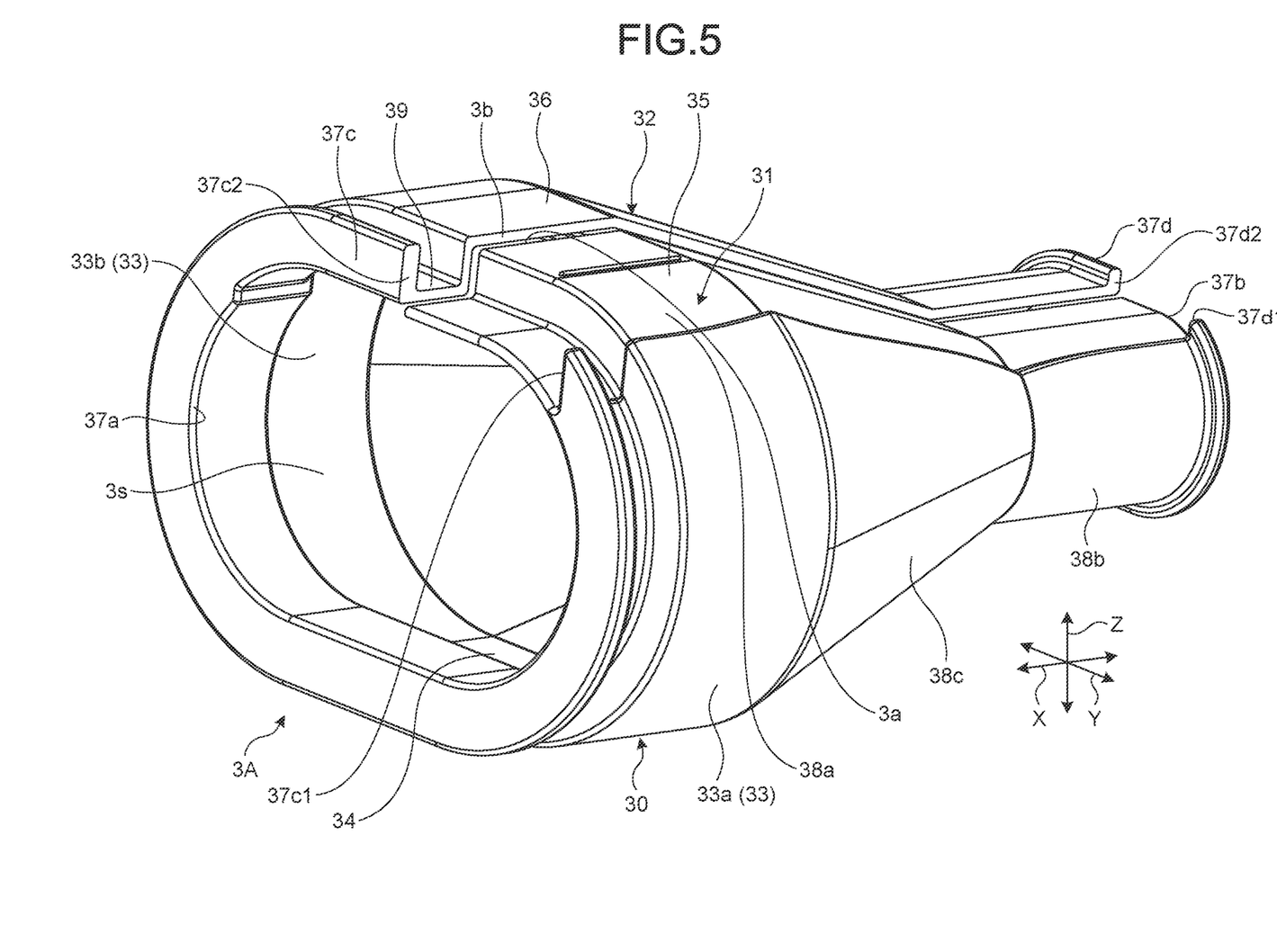
FIG. 5 is a perspective view of the cover member in a state unattached to a cable routing material.
Figure 6:
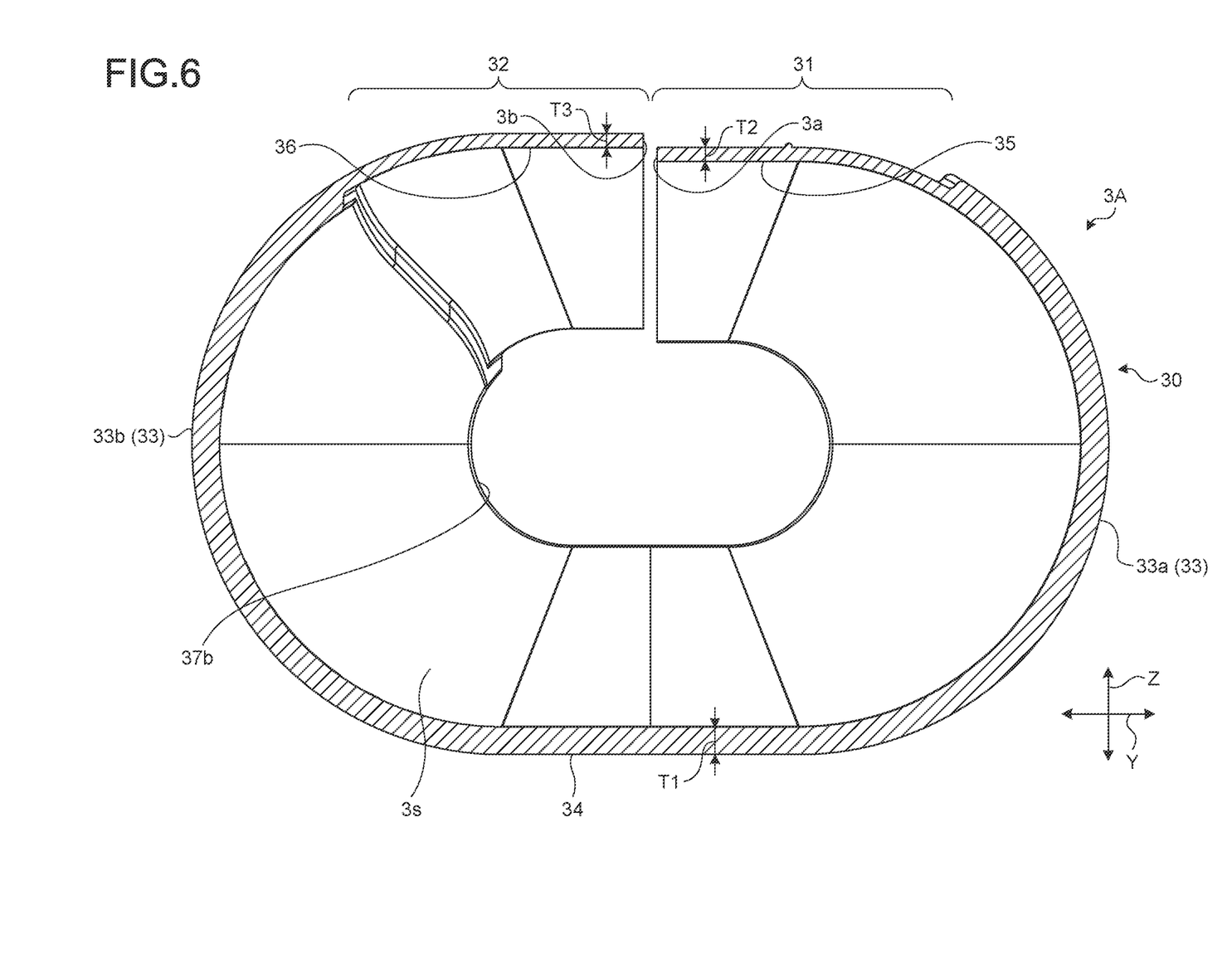
FIG. 6 is a sectional view of the cover member on a plane orthogonal to the axial direction, in a state unattached to a cable routing material.

As illustrated in FIG. 5 and FIG. 6, the main body 3A includes main-body both end parts 3*a* and 3*b* at both ends of the circumferential direction when viewed from the axial direction X. The main body 3A includes, when viewed from the axial direction X, a base area 30, a first overlap area 31 located on one side, and a second overlap area 32 located on the other side with the base area 30 interposed therebetween.

The first overlap area 31 includes a first end part 3*a* as one of the main-body both end parts 3*a* and 3*b*. The second overlap area 32 includes a second end part 3*b* as the other one of the main-body both end parts 3*a* and 3*b*.

The main body 3A is formed with the pair of carved parts 33*a* and 33*b*, the first linear part 34, the second linear part 35, and the third linear part 36. The pair of curved parts 33*a* and 33*b* oppose to each other in the first orthogonal direction Y. The first linear part 34 connects the end parts on respective sides of the pair of curved parts 33*a* and 33*b* in the second orthogonal direction Z. The second linear part 35 is extended along the first or direction Y from the end part on the other side of the first curved part 33*a* in the second orthogonal direction Z and opposes to the first linear part 34. The third linear part 36 is extended along the first orthogonal direction Y from the end on the other side of the second curved part 33*b* in the second orthogonal direction Z and opposes to the first linear part 34.

The main body 3A includes the inside space 3*s* surrounded by and formed by the pair of curved parts 33*a*, 33*b*, the first linear part 34, the second linear part 35, and the third linear part 36. The base area 30 is the first linear part 34, the first curved part 33*a*, and the second curved part 33*b*. The first overlap area 31 is the second linear part 35. The second overlap area 32 is the third linear part 36. The base area 30 is formed to be able to change the overlap amount of the first overlap area 31 and the second overlap area 32.

Further, when the main body 3A is viewed from the axial direction X, the outside of the first overlap area 31 in the radial direction is cut out so that thickness T2 of the first overlap area 31 is thinner than thickness T1 of the base area 30. Moreover, when the main body 3A is viewed from the axial direction X, the inner side of the second overlap area 32 in the radial direction is cut out so that thickness T3 of the second overlap area 32 is thinner than the thickness T1 of the base area 30.

In the embodiment, the thickness T2 of the first overlap area 31 is a half (½) of the thickness T1 of the base area 30, and the thickness T3 of the second overlap area 32 is a half (½) of the thickness T1 of the base area 30. Thus, the thickness of a stack area where the first overlap area 31 overlaps the second overlap area 32 is the same as the thickness of the base area 30. As a result, it is possible to suppress unevenness formed on the outer peripheral surface of the cover member 3, so that the appearance can be improved.

As illustrated in FIG. 5, the main body 3A includes, at both ends of the axial direction X, a pair of opening parts 37*a* and 37*b* for allowing the inside space 3*s* to communicate with the outside. The pair of opening parts 37*a* and 37*b* include the first opening part (one opening part) 37*a* located at one end side (tip side) of the axial direction X, and the second opening part (the other opening part) 37*b* located at the other end side (base end side) of the axial direction X. The inside diameter of the first opening part 37*a* is larger than the inside diameter of the second opening part 37*b*. The main-body both end parts 3*a* and 3*b* are formed from the first opening part 37*a* to the second opening part 37*b*.

The main body 3A includes, at a position corresponding to the first opening part 37*a*, a first flange part (flange part) 37*c* formed to be projected toward the outside of the radial direction. When viewed from the axial direction X, the first flange part 37*c* includes first-flange both end parts 37*c*1 and 37*c*2 at both ends of the circumferential direction. The end part 37*c*1 as one of the first-flange both end parts 37*c*1 and 37*c*2 is located at a position on a boundary between the base area 30 and the first overlap area 31, and the end part 37*c*2 as the other one out of the first-flange both end parts 37*c*1 and 37c2 is located at the second end part 3b out of the main-body both end parts 3a and 3b.

The main body 3A includes, at a position corresponding to the second opening part 37b, a second flange part 37d formed to be projected toward the outside of the radial direction. When viewed from the axial direction X, the second flange part 37d includes second-flange both end parts 37d1 and 37d2 at both ends of the circumferential direction. The end part 37d1 as one of the second-flange both end parts 37d1 and 37d2 is located at a position on a boundary between the base area 30 and the first overlap area 31, and the end part 37d2 as the other one out of the second-flange both end parts 37d1 and 37d2 is located at the second end part 3b out of the main-body both end parts 3a and 3b.

The main body 3A includes the bulge part 38a that is located to be isolated from the first flange part 37c in the axial direction X and is bulged to the outside of the radial direction. In the main body 3A, the recessed part 39 is disposed between the first flange part 37c and the bulge part 38a, and the binding member 3B is disposed in the recessed part 39. In other words, in the main body 3A, the binding member 3B is disposed in the recessed part 39 located between the first flange part 37c and the bulge part 38a.

The binding member 3B is a cable tie, for example, which is formed integrally with an insulating synthetic resin and includes a belt part 3b1 and a locking part 3b2 as illustrated in FIG. 1. The belt part 3b1 is formed in a mode to be extended in one direction from the locking part 3b2. The locking part 3b2 includes a locking hole to which the tip of the belt part 3b1 can be inserted. Such a binding member 3B fixes the cable routing material W to the main body 3A by disposing a part of the shield shell 2 in the inside space 3s, winding the belt part 3b1 around the outer peripheral surface of the recessed part 39, inserting the tip of the belt part 3b1 into the locking part 3b2, and fastening the belt part 3b1 forming an annular shape. In other words, the binding member 3B fixes the cable routing material W to the main body 3A when a part of the cable routing material W is disposed in the inside space 3s of the main body 3A.

The main body 3A includes an adjacent part 38b located adjacent to the second flange part 37d in the axial direction X.

The main body 3A includes a widened part 38c between the adjacent part 38b and the bulge part 38a in the axial direction X. The widened part 38c is a part that is gradually expanded in the width along the first orthogonal direction Y and expanded in the height along the second orthogonal direction Z as approaching the bulge part 38a from the adjacent part 38b along the axial direction X.

Next, assembly of the wire harness WH1 configured as above will be described by referring to FIG. 4. First, an operator inserts the metal terminal Wb1 of the first electric wire Wa1 into the braided conductor Wh, inserts the metal terminal Wb1 of the first electric wire Wa1 into the ring member 2B, and inserts the metal terminal Wb1 of the first electric wire Wa1 into the shell tubular part 22 of the shield shell 2.

Then, the operator adjusts the through hole of the metal terminal Wb1 with the through hole of the mating metal terminal Wb2. Then, the operator inserts the screw part of the first bolt Bo1 into the through hole of the metal terminal Wb1 and the through hole of the mating metal terminal Wb2, and fastens the screw part of the first bolt Bo1 and the screw hole so as to tighter, the metal terminal Wb1 and the mating metal terminal Wb2 together to be fixed to the connector 1. Thereby, the operator houses the metal terminal Wb1 and the mating metal terminal Wb2 in the housing space 10s inside the connector 1, and electrically connects the first electric wire Wa1 and the mating electric wire Wa2.

Then, the operator disposes the tip of the braided conductor Wh in the axial direction X in the outer peripheral surface of the shell tabular part 22 of the shield shell 2. Thereafter, the operator disposes the ring member 2B in the outer peripheral surface of the tip of the braided conductor Wh in the axial direction X. Then, the operator sandwiches the braided conductor Wh with the ring projection part 27b and the shell tubular part 22, and electrically connects the braided conductor Wh and the shield shell 2. Thereafter, as illustrated in FIG. 2, the operator brings the abutting part 27c of the ring member 2B to contact the shell flange part 23 of the shell main body 2A, and determines the position of the ring member 2B in the axial direction X with respect to the shell main body 2A.

Then, the operator brings the shell flange part 23 of the shell main body 2A to contact the inner block body 13e of the connector 1 in the axial direction X, and determines the position of the shield shell 2 in the axial direction X with respect to the connector 1.

Then, in a state where the screw part of the third bolt Bo3 is inserted into the through holes 24dh and 24eh of the through-hole forming parts 24d and 24e, the operator fastens the screw part of the third bolt Bo3 and the screw hole 13eh of the inner block body 13e so as to attach the shield shell 2 to the connector 1.

Then, in a state where the screw part of the second bolt Bo2 is inserted into the through holes 12dh and 13dh of the outsider block bodies 12d and 13d and into the through hole of the mating connector 100, the operator fastens the screw part of the second bolt Bo2 and the screw hole of the nut so as to attach the connector 1 to the mating connector 100.

In this state, the first electric wire Wa1 and the mating electric wire Wa1 are electrically connected, so that the conventional grommet formed in a tubular shape and the connector 1 formed in a tubular shape cannot be wrapped around the cable routing material W. However, the main-body both end parts 3a and 3b of the cover member 3 according to the embodiment are formed from the first opening part 37a to the second opening part 37b along the axial direction X, so that the inside space 3s can be exposed between the main-body both end parts 3a and 3b by deforming the base area 30 such as to isolate the main-body both end parts 3a and 3b from each other. In this state, that is, in a state where the first electric wire Wa1 and the mating electric wire Wa2 are electrically connected, the operator disposes the shell tubular part 22 and the ring member 2B into the inside space 3s of the main body 3A.

Figure 3:
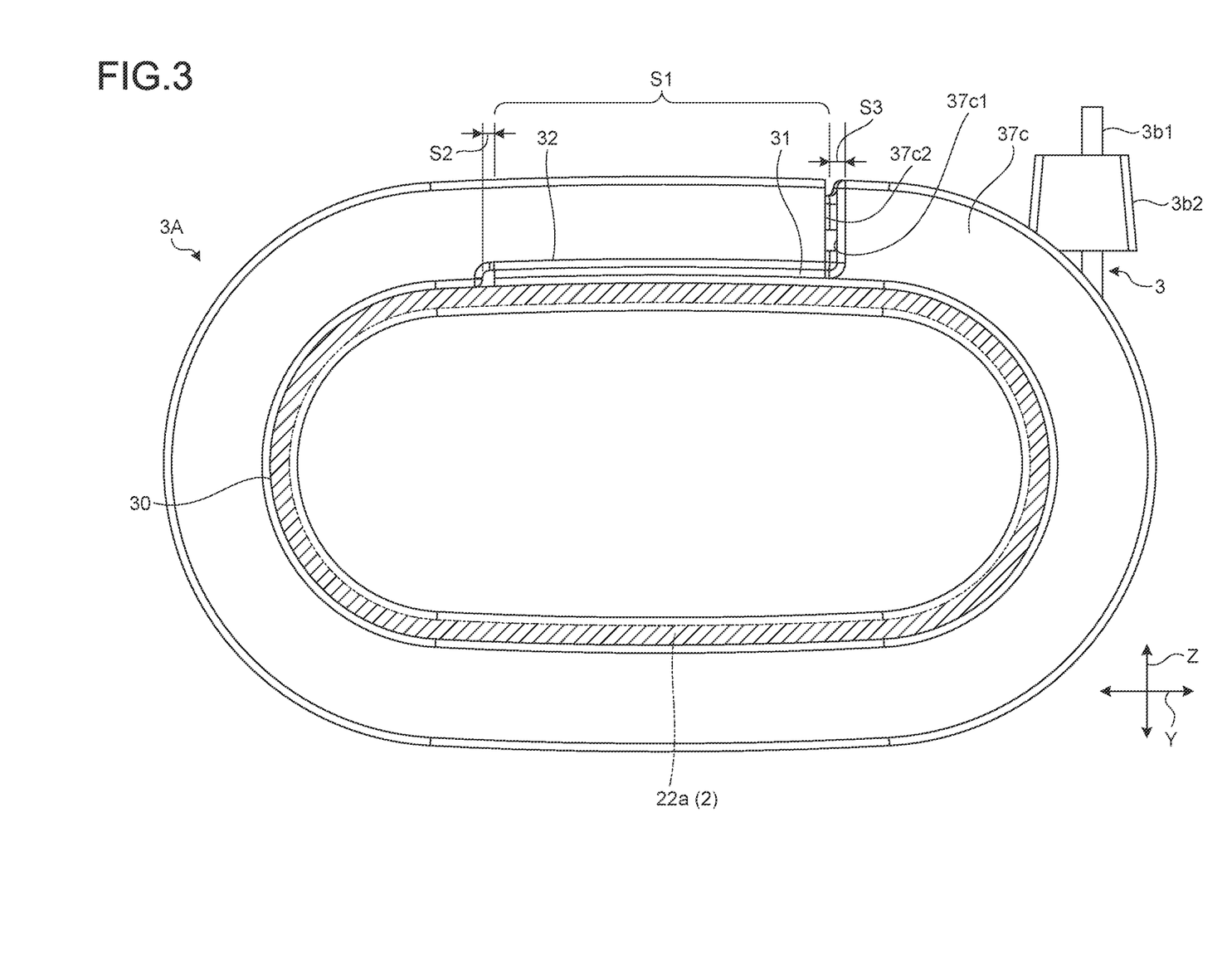
FIG. 3 is a sectional view illustrating a base area, a first overlap area, and a second overlap area when the cover member is viewed from an axial direction.

Thereafter, the operator places the second overlap area 32 over the first overlap area 31, and then deforms the base area 30 of the main body 3A so as to change the overlap amount of the first overlap area 31 and the second overlap area 32 to wrap the cover member 3 around the cable routing material W. More specifically, as illustrated in FIG. 3, the main body 3A in this state includes a stack area S1 where the first overlap area 31 and the second overlap area 32 overlap with each other, a first area S2 of the first overlap area 31, and a second area S3 of the second overlap area 32 alone. Further, as for the cover member 3, the inside diameters of the first opening part 37a and the second opening part 37b become smaller when the overlap amount of the first overlap area 31 and the second overlap area 32 is increased, while the inside diameters of the first opening part 37a and the second opening part 37b become larger when the overlap amount is decreased. Since the first flange part 37c does not exist in the first overlap area 31 of the cover member 3, there is no excessive flange part to be an obstacle when overlapping the first overlap area 31 and the second overlap area 32. Further, when overlapping the first overlap area 31 and the second overlap area 32, it is possible to easily change the overlap amount through grasping, by the operator, the end part 37c1 out of the flange both end parts 37c1 and 37c2 located in the base area 30 and the other end part 37c2 out of the flange both end parts 37c1 and 37c2 located at the second end part 3b out of the main-body both end parts 3a and 3b. When viewed from the axial direction X in a state where the first overlap area 31 and the second overlap area 32 overlap with each other, the main body 3A is in a substantially oval tubular shape. In this manner, the cover member 3 is wrapped around the shield shell 2 by winding the cover member 3 around the outer peripheral surface of the shield shell 2. Further, as for the cover member 3 in a state where the shield shell 2 is disposed in the inside space 3s of the main body 3A, the outer peripheral surface of the shell tubular part 22 contacts the inner peripheral surface of the recessed part 39, and the outer peripheral surface of the ring member 2B contacts the inner peripheral surface of the bulge part 38a.

Then, the operator winds the belt part 3b1 of the binding member 3B around the outer peripheral surface of the recessed part 39, and inserts the tip of the belt part 3b1 into the locking part 3b2 to fix the cable routing material W to the main body 3A.

At last, the operator winds a tape member TA around the outer peripheral surface of the second flange part 37d and the outer peripheral surface of the first electric wire Wa1 that is located adjacent to the second flange part 37d and exposed from the second opening so as to fix the main body 3A to the first electric wire Wa1. Thereby, assembling of the wire harness WH1 is completed.

Figure 7:
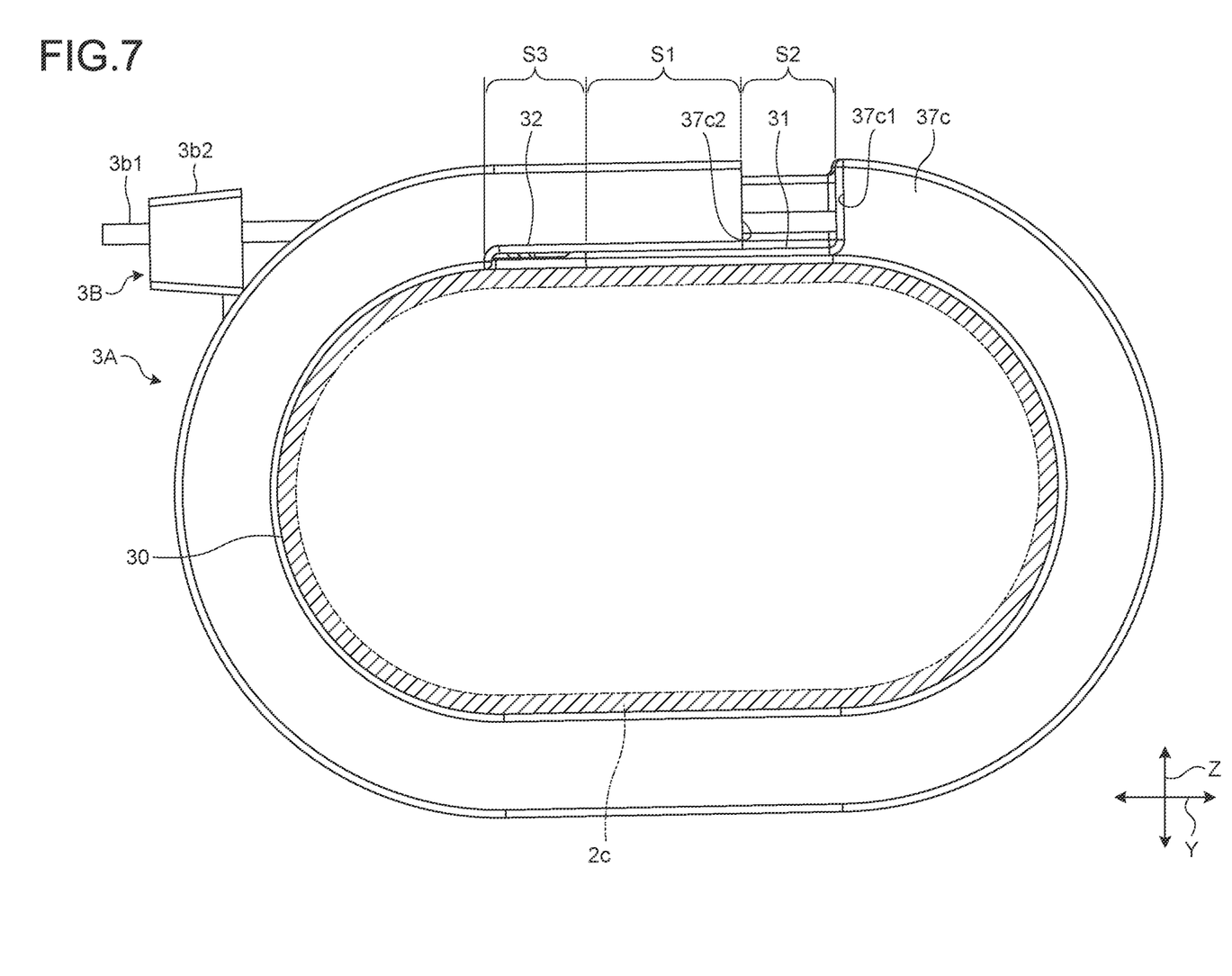
FIG. 7 is a sectional view illustrating the base area, the first overlap area, and the second overlap area when the cover member is viewed from the axial direction, in a state where one of opening parts is attached to another shield shell having a shell tubular part of different size.

Such a cover member 3 can be wrapped around a shield shell 2c that has a shape different from the shield shell 2. As illustrated in FIG. 7, the main body 3A includes the stack area S1 where the first overlap area 31 and the second overlap area 32 overlap with each other, the first area S2 of the first overlap area 31, and the second area S3 of the second overlap area 32 alone. The width of the stack area S1 is narrower compared to that of FIG. 3 by corresponding to the shape of the shield shell 2c, and the inside diameter of the first opening part 37a is smaller.

The cover member 3 and the wire harness WH1 according to the embodiment have the following configurations. The base area of the cover member 3 and the wire harness WH1 according to the present invention is formed to be able to change the overlap amount of the first overlap area 31 and the second overlap area 32. As a result, the cover member 3 according to the present invention can be attached to the cable routing materials W of different shapes. Therefore, the cover member 3 exhibits versatility and requires no individual design change for corresponding to the shapes of the cable routing materials W.

The cover member 3 and the wire harness WH1 according to the embodiment include the following configurations. When viewed from the axial direction X, one end part out of the flange both end parts is located on the boundary between the base area 30 and the first overlap area 31, and the other end part out of the flange both end parts is located at the other end part out of the main-body both end parts 3a and 3b. Therefore, since the flange part does not exist in the first overlap area 31 of the cover member 3 according to the embodiment, there is no excessive flange part to be an obstacle when overlapping the first overlap area 31 and the second overlap area 32. As a result, with the cover member 3 according to the embodiment, the operability at the time of assembling can be improved. Moreover, as for the cover member 3 according to the embodiment, when overlapping the first overlap area 31 and the second overlap area 32, it is possible to easily change the overlap amount through grasping, by the operator, one end part out of the flange both end parts located in the base area 30 and the other end part out of the flange both end parts located at the second end part 3b out of the main-body both end parts 3a and 3b. Therefore, with the cover member 3, it is easy to change the overlap amount.

The cover member 3 and the wire harness WH1 according to the embodiment have the following configurations. When the main body 3A is viewed from the axial direction X, the outside of the first overlap area 31 in the radial direction is cut out so that the thickness of the first overlap area 31 is thinner than the thickness of the base area 30. Further, as for the main body 3A, the inner side of the second overlap area 32 in the radial direction is cut out so that the thickness of the second overlap area 32 is thinner than the thickness of the base area 30. Therefore, it is possible to suppress a large difference generated between the thickness of the base area 30 and the thickness of the area where the first overlap area 31 and the second overlap area 32 overlap with each other. As a result, with the cover member 3 of the embodiment, it is possible to suppress deterioration of the appearance.

The cover member 3 and the wire harness WH1 according to the embodiment have the following configurations. The main body 3A is formed with the pair of curved parts 33a, 33b, the first linear part 34, the second linear part 35, and the third linear part 36. The pair of curved parts 33a and 33b oppose to each other in the first orthogonal direction Y. The first linear part 34 connects the end parts on one side of the pair of curved parts 33a and 33b in the second orthogonal direction Z. The second linear part 35 is extended along the first orthogonal direction Y from the end part on the other side of the first curved part 33a in the second orthogonal direction Z and opposes to the first linear part 34. The third linear part 36 is extended along the first orthogonal direction Y from the end on the other side of the second curved part 33b in the second orthogonal direction Z and opposes to the first linear part 34. The base area 30 is the first linear part 34, the first curved part 33a, and the second curved part 33b. The first overlap area 31 is the second linear part 35. The second overlap area 32 is the third linear part 36. Thus, when overlapping the first overlap area 31 and the second overlap area 32 of the cover member 3 according to the embodiment, one of the overlap areas 31 and 32 each formed with a linear part may overlap with the other one out of the overlap areas 31 and 32. Therefore, with the cover member 3 according to the embodiment, it is possible to easily overlap one of the overlap areas 31 and 32 over the other one of the overlap areas 31 and 32.

The cover member 3 and the wire harness WH1 according to the embodiment have the following configurations. The main body 3A includes the bulge part 36a that is located to be isolated from the flange part in the axial direction and is bulged to the outside of the radial direction. The binding member 3B is disposed in the recessed part 39 located between the flange part and the bulge part 38a. Thus, with the cover member 3 according to the embodiment, move of the binding member 3B in the axial direction X can be restricted by the flange part and the bulge part 38a. Therefore, it is easy to fix the main body 3A to the cable routing material W with the binding member 3B.

The cover member 3 and the wire harness WH1 according to the embodiment have the following configurations. The cable routing material W includes the conductive electric wire extended in the axial direction X, the braided conductor Wh formed with a conductive material and covers the outer peripheral surface of the electric wire, and the shield shell 2 that is electrically connected to the braided conductor Wh and covers the outer peripheral surface of one end part of the first electric wire Wa1 in the axial direction X, and the main body 3A is fixed to the shield shell 2 by the binding member 3B. Therefore, the cover member 3 according to the embodiment can cover a part of the shield shell 2 and the outer peripheral surface of one end part of the braided conductor Wh in the axial direction X. As a result, it is possible to improve the appearance of the wire harness WH1.

The cover member 3 and the wire harness WH1 according to the embodiment have the following configurations. The main-body both end parts 3a and 3b are formed from the first opening part 37a to the second opening part 37b of the pair of opening parts 37a and 37b. Thus, with the cover member 3 according to the embodiment, in a state where the first electric wire Wa1 and the mating electric wire Wa1 are electrically connected, it is possible to wrap the main body 3A around the cable routing material W by disposing the cable routing material W in the inside space 3s by isolating the first end part 3a and the second end part 3b of the main-body both end parts 3a and 3b. Therefore, with the cover member 3 according to the embodiment, the operability at the time of attachment work can be improved.

In the embodiment above, a case of using the first electric wire Wa1 for the cable routing material W is described. However, the present invention is not limited thereto, but a metal bar, an electric wire bundle, a cable, or the like can be used as the cable routing material W. The metal bar is formed by covering the outside of a conductive bar-like member with an insulating cover part. The electric wire bundle is formed by handling a plurality of the first electric wires Wa1. The cable is formed by covering the outside of the cover part of the first electric wire Wa1 with an insulating sheath.

Further, in the embodiment above, it is described to fix the main body 3A to the first electric wire Wa1 by winding the tape member around the outer peripheral surface of the second flange part 37d and the outer peripheral surface of the first electric wire Wa1 that is located adjacent to the outer peripheral surface of the second flange part 37d and exposed from the second opening part 37b. However, the present invention is not limited thereto. The main body 3A may be fixed to the first electric wire Wa1 by winding the binding member 3B around the outer peripheral surface of the part adjacent to the second flange part 37d of the main body 3A.

The main body 3A of the cover member 3 according to the embodiment above is described to be in a substantially oval tubular shape when viewed from the axial direction X in a state where the first overlap area 31 and the second overlap area 32 overlap with each other. However, the present invention is not limited thereto. The main body 3A may have a substantially rectangular tubular shape when viewed from the axial direction X in a state where the first overlap area 31 and the second overlap area 32 overlap with each other.

Further, the shell tubular part 22 of the shield shell 2 according to the embodiment above is described to be in a substantially oval tubular shape. However, the present invention is not limited thereto, and the shell tubular part 22 may have a substantially tubular tubular shape.

Further, the ring member 2B of the shield shell 2 according to the embodiment above is described to be in a substantially oval tubular shape. However, the present invention is not limited thereto, and the ring member 2B may have a substantially rectangular tubular shape.

Further, the embodiment above is described that the first overlap area 31 is the second linear part 35, and the second overlap area 32 is the third linear part 36. However, the present invention is not limited thereto, but the first overlap area 31 may be one of the pair of curved parts 33a and 33b, and the second overlap area 32 may be the other one of the pair of curved parts 33a and 33b.

Further, the embodiment above is described that the main body 3A in the first overlap area 31 is formed to be in a flat plate shape. However, the present invention is not limited thereto, and the main body 3A in the first overlap area 31 may be formed in a tapered shape such that the thickness thereof becomes gradually thinner from the base end side located on the base area 30 side toward the first end part 3a.

Further, the embodiment above is described that the main body 3A in the second overlap area 32 is formed to be an a flat plate shape. However, the present invention as not limited thereto, and the main body 3A in the second overlap area 32 may be formed in a tapered shape such that the thickness thereof becomes gradually thinner from the base end side located on the base area 30 side toward the second end part 3b.

The base area of the cover member and the wire harness according to the present embodiment is formed to be able to change the overlap amount of the first overlap area and the second overlap area. As a result, the cover member according to the present embodiment can be attached to the cable routing materials of different shapes. Therefore, the cover member exhibits versatility and requires no individual design change for corresponding to the shapes of the cable routing materials.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:
1. A cover member comprising:
a main body that includes main-body both end parts at both ends in a circumferential direction of the main body when viewed from an axial direction of the cover member, the main body being configured to cover a part of a cable routing material; and
a binding member that is configured to fix the cable routing material to the main body when a part of the cable routing material is disposed in an inside space of the main body, wherein
the main body includes, when viewed from the axial direction, a base area, a first overlap area located on one side, and a second overlap area located on other side with the base area interposed therebetween,
the first overlap area includes a first end part out of the main-body both end parts,
the second overlap area includes a second end part out of the main-body both end parts,
the base area is formed to be able to change an overlap amount of the first overlap area and the second overlap area,
the main-body both end parts are formed from one opening part out of a pair of opening parts to the other opening part, the pair of opening parts communicating the inside space with a spaced outside of the cover member, at a position corresponding to the one opening part, a flange part projects from the main body outwardly along a radial direction of the main body,
the flange part includes, when viewed from the axial direction, flange both end parts at both ends of the circumferential direction,
one end part out of the flange both end parts is located on a boundary between the base area and the first overlap area, and the other end part out of the flange both end parts is located at the second end part out of the main-body both end parts,
the main body includes a bulge part that is located to be isolated from the flange part in the axial direction and is bulged outwardly along the radial direction, and
a recessed part located between the flange part and the bulge part, the binding member is disposed in the recessed part, and
the second overlap area includes the flange part, the recessed part, and the bulge part.

2. The cover member according to claim 1, wherein
in the main body when viewed from the axial direction, a thickness of the first overlap area is thinner than a thickness of the base area because an outside of the first overlap area in the radial direction is cut out, and a thickness of the second overlap area is thinner than the thickness of the base area because an inner side of the second overlap area in the radial direction is cut out.

3. The cover member according to claim 1, wherein
the main body comprises:
a pair of curved parts that oppose to each other in a first orthogonal direction that is orthogonal to the axial direction;
a first linear part that connects end parts on respective sides of the pair of curved parts in a second orthogonal direction that is orthogonal to the axial direction and the first orthogonal direction;
a second linear part that extends along the first orthogonal direction from the other side in the second orthogonal direction of a first curved part out of the pair of curved parts and opposes to the first linear part; and
a third linear part that extends along the first orthogonal direction from the other side in the second orthogonal direction of a second curved part out of the pair of curved parts and opposes to the first linear part,
the base area is the first linear part, the first curved part, and the second curved part,
the first overlap area is the second linear part, and
the second overlap area is the third linear part.

4. The cover member according to claim 2, wherein
the main body comprises:
a pair of curved parts that oppose to each other in a first orthogonal direction that is orthogonal to the axial direction;
a first linear part that connects end parts on respective sides of the pair of curved parts in a second orthogonal direction that is orthogonal to the axial direction and the first orthogonal direction;
a second linear part that extends along the first orthogonal direction from the other side in the second orthogonal direction of a first curved part out of the pair of curved parts and opposes to the first linear part; and
a third linear part that extends along the first orthogonal direction from the other side in the second orthogonal direction of a second curved part out of the pair of curved parts and opposes to the first linear part,
the base area is the first linear part, the first curved part, and the second curved part,
the first overlap area is the second linear part, and
the second overlap area is the third linear part.

5. The cover member according to claim 1, wherein
the cable routing material comprises:
an electric wire that exhibits conductivity and is extended along the axial direction;
a braided conductor that is formed with a conductive material and covers an outer peripheral surface of the electric wire; and
a shield shell that is electrically connected to the braided conductor and covers an outer peripheral surface of one end part of the electric wire in the axial direction, and
the main body is to be fixed to the shield shell with the binding member.

6. The cover member according to claim 2, wherein
the cable routing material comprises:
an electric wire that exhibits conductivity and is extended along the axial direction;
a braided conductor that is formed with a conductive material and covers an outer peripheral surface of the electric wire; and
a shield shell that is electrically connected to the braided conductor and covers an outer peripheral surface of one end part of the electric wire in the axial direction, and
the main body is to be fixed to the shield shell with the binding member.

7. The cover member according to claim 3, wherein
the cable routing material comprises:
an electric wire that exhibits conductivity and is extended along the axial direction;
a braided conductor that is formed with a conductive material and covers an outer peripheral surface of the electric wire; and
a shield shell that is electrically connected to the braided conductor and covers an outer peripheral surface of one end part of the electric wire in the axial direction, and
the main body is to be fixed to the shield shell with the binding member.

8. A wire harness comprising:
a cable routing material extended along an axial direction, the cable routing material includes:
an electric wire, a braided conductor that is formed with a conductive material and covers an outer peripheral surface of the electric wire, a shield shell that is electrically connected to the braided conductor and covers an outer peripheral surface of one end part of each of the electric wire and the braided conductor in the axial direction; and
a cover member wrapped around the shield shell, wherein
the cover member comprises:
a main body that includes main-body both end parts at both ends in a circumferential direction of the main body when viewed from the axial direction of the cover member, the main body covering a part of the cable routing material; and
a binding member that fixes the shield shell to the main body,
the main body comprises, when viewed from the axial direction, a base area, a first overlap area located on one side, and a second overlap area located on another side with the base area interposed therebetween,
the first overlap area includes a first end part out of the main-body both end parts, the second overlap area includes a second end part out of the main-body both end parts, the base area is formed to be able to change an overlap amount of the first overlap area and the second overlap area, the main-body both end parts are formed from one opening part out of a pair of opening parts to the other opening part, the pair of opening parts communicating an inside space of the body with a space outside of the cover member, at a position corresponding to the one opening part, a flange part projects from the main body outwardly along a radial direction of the main body, the flange part includes, when viewed from the axial direction, flange both end parts at both ends of the circumferential direction, one end part out of the flange both end parts is located on a boundary between the base area and the first overlap area, and the other end part out of the flange both end parts is located at the second end part out of the main-body both end parts, the main body includes a bulge part that is located to be isolated from the flange part in the axial direction and is bulged outwardly along the radial direction, and a recessed part located between the flange part and the bulge part, the binding member is disposed in the recessed part, and the second overlap area includes the flange part, the recessed part, and the bulge part.

* * * * *